United States Patent [19]

Kloker et al.

[11] 4,309,772
[45] Jan. 5, 1982

[54] SOFT QUANTIZER FOR FM RADIO BINARY DIGITAL SIGNALING

[75] Inventors: Kevin L. Kloker, Rolling Meadows, Ill.; James A. Pautler, St. Louis, Mo.

[73] Assignee: Motorola, Inc., Schaumburg, Ill.

[21] Appl. No.: 114,851

[22] Filed: Jan. 24, 1980

[51] Int. Cl.³ .............................................. H03K 6/04
[52] U.S. Cl. .............................. 375/76; 340/347 AD; 375/94; 375/104; 364/724; 455/312
[58] Field of Search ............... 375/76, 94, 96, 99, 375/102, 103, 104; 364/724, 737, 574, 572; 340/347 AD, 347 CC; 455/303, 304, 305, 306, 307, 312; 328/115, 142; 307/350

[56] References Cited

U.S. PATENT DOCUMENTS

| | | | |
|---|---|---|---|
| 3,810,156 | 5/1974 | Goldman | 340/347 AD |
| 3,824,498 | 7/1974 | McBride | 332/9 R |
| 3,868,678 | 2/1975 | Michael | 340/347 AD |
| 3,931,576 | 1/1976 | Gersho et al. | 332/11 D |
| 3,980,873 | 9/1976 | Mattei | 375/103 |
| 4,003,001 | 1/1977 | Jones, Jr. | 332/1 |
| 4,029,904 | 6/1977 | Papeschi | 375/99 |
| 4,057,797 | 11/1977 | Jorgensen | 340/347 DD |
| 4,087,677 | 5/1978 | Dunn et al. | 375/9 |
| 4,130,806 | 12/1978 | Van Gerwen et al. | 375/94 |

*Primary Examiner*—Benedict V. Safourek
*Attorney, Agent, or Firm*—James W. Gillman; Edward M. Roney; James S. Pristelski

[57] ABSTRACT

A soft quantizer for assigning numerical weights to hard quantized output bits of a binary digital detector in a digital receiver based on the noise energy level of the received baseband data. An analog signal, derived from the discriminator noise level, is digitized by an analog to digital converter for use as an address to look up predetermined numerical weights for soft quantized values in a memory table. The addressed numerical weights are combined with the hard quantized output bits of the digital detector to generate soft quantized data values.

8 Claims, 5 Drawing Figures

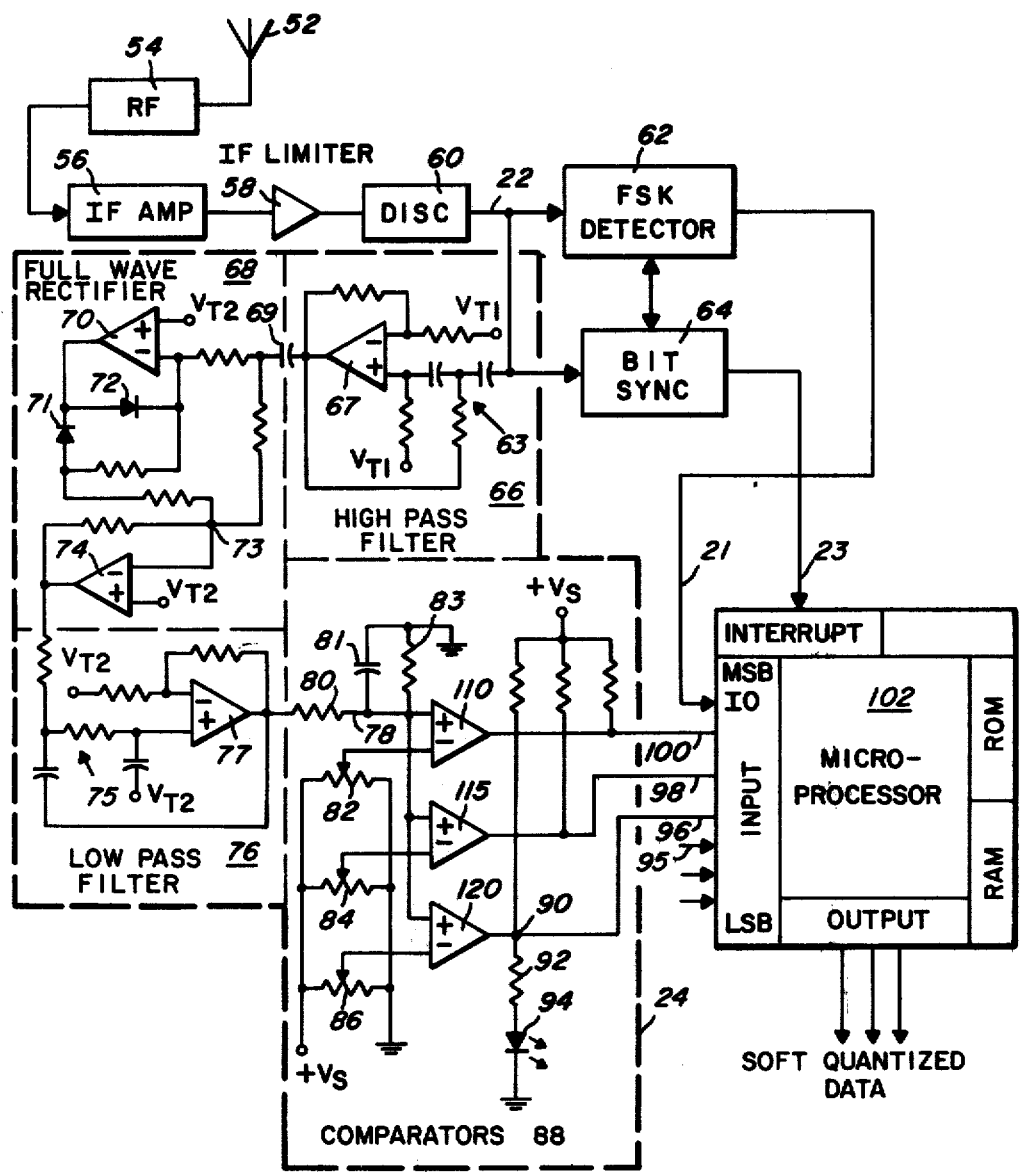

MICROPROCESSOR STEPS FOR SOFT QUANTIZER

```
INTERRUPT   BIT ← 0
            SUM ← 0
            LEVEL ← 3
            INPUT ← INPUT PORT    READ INPUT PORT
            ACC ← INPUT
            ROLC
            INPUT ← ACC                            STRIP OFF RECEIVED FSK
            ACC ← SUM                              DATA BY ROTATING ACC LEFT
            ROLC                                   WITH CARRY, AND ROTATING
            ROLC                                   CARRY INTO SUM ROTATE 3
            ROLC                                   MORE TIMES TO MULTIPLY
            ROLC                                   FSK BIT BY 8. READ IN THE
            SUM ← ACC                              REST OF THE INPUT
LOOP        ACC ← INPUT                            INCREMENT SUM BY ONE
            ROLC                                   EACH TIME A THRESHOLD
            LEVEL ← LEVEL-1                        LEVEL IS EXCEEDED.
            IF (CARRY=0) GO TO TEST
            SUM ← SUM + 1
TEST        IF (LEVEL > 0) GO TO LOOP              LOOK UP SOFT QUANTIZED
            ADDRESS ← TABLE ← SUM                  VALUE IN THE MEMORY
            SOFTQ ← MEMORY (ADDRESS)               TABLE STARTING AT TAB
                                                   NOW GO TO DECODER.
```

Fig. 4

TABLE VALUES FOR TYPICAL MOBILE RADIO FAST-FADING CHANNEL

HIGH SIGNAL ↔ LOW SIGNAL

| TABLE    | 7 | TABLE+8  | 8  |         |
|----------|---|----------|----|---------|
| TABLE+1  | 4 | TABLE+9  | 11 | (B HEX) |
| TABLE+2  | 2 | TABLE+10 | 13 | (D HEX) |
| TABLE+3  | 0 | TABLE+11 | 15 | (F HEX) |

(ZERO'S)                    (ONE'S)

Fig. 5

SOFT QUANTIZER FOR FM RADIO BINARY DIGITAL SIGNALING

BACKGROUND OF THE INVENTION

This invention relates generally to digital communication systems and more particularly to the generation of soft quantized data values representative of the error probability of the received binary data in a digital receiver employing non-linear demodulation.

Digital communication systems, such as mobile data systems, are employing increasingly complex coding schemes to reduce the effect of channel noise. Decoders employing soft quantization are attractive for improving performance, but typical frequency shift keying (FSK) detectors used in mobile data systems are non-linear. The detected binary data is therefore not representative of the error probability of the detected data since the detector transforms the received data to binary ones or zeros, i.e. hard quantized data. FM threshold and limiting effects therefore ordinarily prevent good resolution of soft quantized data values from the signal level of the FSK detector output.

To solve this problem a soft quantizer utilizing an analog signal level derived from the audio noise level of the FM discriminator output is disclosed. This analog signal level is a better indication of the magnitude, or numerical weight, of the detected binary bits than the hard quantized data bits from the FSK detector output, so that the benefits of soft quantization in the decoding process can be obtained for FM/FSK mobile data systems.

SUMMARY OF THE INVENTION

It is a general object of this invention to provide a soft quantizer for use in a digital receiver employing a non-linear demodulation scheme.

It is a more particular object of this invention to provide a soft quantizer for an FM/FSK mobile data receiver which derives the soft quantized values from a hard quantized FSK detector and the FM discriminator noise level.

Briefly, in accordance with the preferred embodiment of the invention, a soft quantizer for use in a mobile data system to permit improved data reception inherent in soft quantized decoding is comprised of an analog to digital converter means, a memory means, and a combiner means. The analog to digital converter means is used to generate an address from an analog signal level indicative of the amplitude of the noise level in the recovered baseband signal of the receiver. A memory means is used to store predetermined numerical weights in a table addressed by the analog to digital converter means output. The combiner means, which may be simply an output line to the memory means, combines the FSK data bit with the analog to digital converter means output or with the memory means output to generate a soft quantized data value dependent on both the analog noise level and the FSK data bit.

DESCRIPTION OF THE DRAWINGS

FIG. 3 is a circuit schematic of the preferred embodiment of the invention shown in the block form in FIG. 1 for use with an FM/FSK receiver and a microprocessor decoder.

FIG. 4 is a listing of the microprocessor steps for implementing part of the soft quantizing process used by the preferred embodiment of the invention of FIG. 3.

FIG. 5 is a table of soft quantized values for programming the memory table used in the preferred embodiment of the invention in FIG. 3.

DETAILED DESCRIPTION OF THE PREFERRED EMBODIMENT

Figure 1:
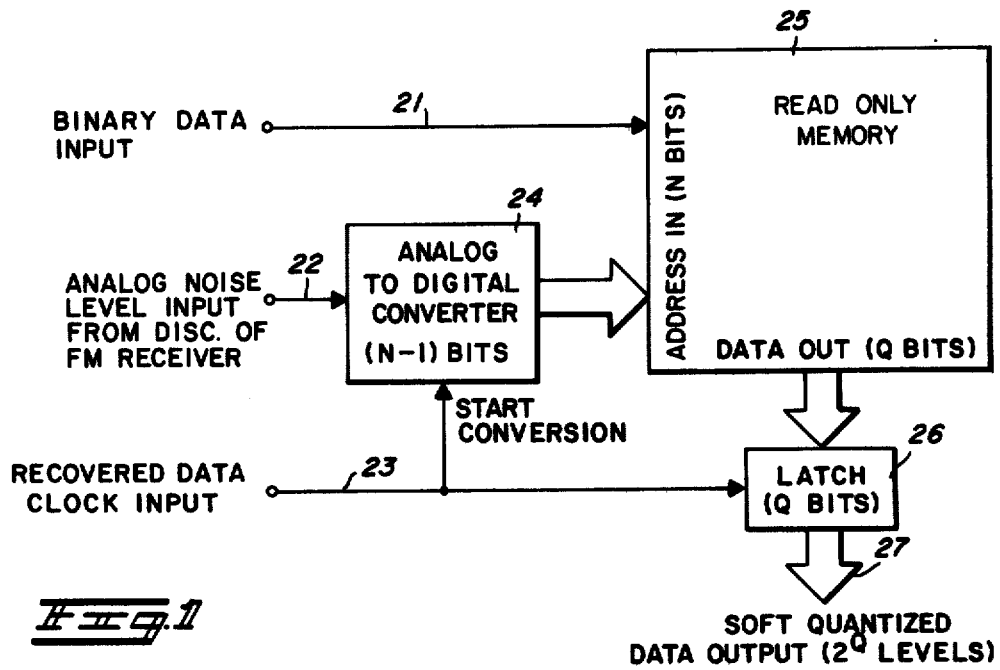
FIG. 1 is a block diagram of the preferred embodiment of a soft quantizer according to the present invention.

Digital communication systems employing binary digital data transmission are using increasingly complex coding schemes to reduce data errors caused by channel noise. In the field of mobile data communications, binary digital data transmission has been generally limited to audio FSK, which is actually FM/FSK employing two levels of modulation, due to FM and voice compatibility requirements. The mobile FM channel is a particularly severe environment, and bit error rates fall off relatively slowly with increased signal level due to fast fading, a condition wherein relative motion between the mobile receivers and transmitters causes random occurrences of low signal level at the receiver, due to multipath propagation. Although coding is useful for eliminating the effects of fading, the decoding process is significantly improved if the decoder can take into account those received data bits which are associated with the random occurrences of low signal level. This can be done if the decoder is given a numerical weight, or relative error probability for each detected bit, which measures the likelihood that the bit is erroneous, as a function of the FM discriminator noise level. This invention weights each data bit by the discriminator noise level which is derived from a part of the frequency spectrum where there is little energy from the data signal.

In general, a decoder estimates a decoded data bit based on a number of received data samples. For example, a threshold decoder decides if a group of syndrome bits, logically derived from received encoded bits, are predominantly binary ones or zeros to decide if a received information bit is correct. Mathematically this operation is an averaging operation, and the weights can be taken into account by using a weighted average. This is equivalent to representing each received data sample by a number between one and minus one, where the magnitude of the weighted sample represents the relative probability that the received sample is error free. In such a sign plus magnitude representation, the sign corresponds to the output of the binary detector and the magnitude corresponds to the numerical weight, or relative error probability. Then a binary exclusive—OR corresponds to multiplication in a sign plus magnitude representation, and a threshold operation corresponds to an average.

For very simple decoder systems, unsigned arithmetic is preferred. In such a case the value of a bit may, for example, be represented by four binary digits representing numbers ranging from zero to fifteen, corresponding to the one to minus one sign plus magnitude representation. The fact that the threshold corresponds to 7.5 is taken into account by scaling and using predetermined thresholds after the multiplication or summing operations corresponding to the exclusive—OR or the majority logic of a binary decoder. Representing a received data sample by a number of levels, corresponding to a binary value, is termed "soft quantization", whereas the representation of received data sample by a binary bit, or two level representation, is termed "hard quantization".

It should be noted that soft quantization may be used with any kind of decoding to gain improved performance since the process of hard quantization throws away information. Implementation of decoders for soft quantized data is known to persons skilled in the coding and information theory arts. For mobile data applications, block and convolutional coding is often used, and several decoding algorithms may be adapted to decode soft quantized data. In such decoders the soft quantized data values are correlated with various coded patterns of binary zeros and ones, and employ distance measures or averaging techniques in the correlation calculation to improve the decoding decisions.

The present invention concerns the generation of soft quantized data values in a digital receiver employing a non-linear demodulation scheme, such as FM/FSK used in mobile data systems. In a receiver using a non-linear demodulation scheme, it is difficult to build a detector with a soft quantized data output in which the detailed signal levels are proportional to the relative bit error probabilities. This is in contrast to a linear modulation scheme such as phase shift keying (PSK) where a linear receiver and an integrate-and-dump detector are employed. In a linear system the detector output level, proportional to the input signal plus noise level, is a measure of the relative bit error probabilities.

In a typical mobile data system, a soft quantized data value is best derived from the hard quantized FSK detector output and the FM discriminator output noise level. Because of the sharp threshold effect associated with an FM/FSK system, the FSK detector output level, even before it is hard quantized, is practically worthless as an indication of the numerical weight of a received bit. The FM discriminator output noise level is a better indication of the numerical weight of a received bit, although the weight is a non-linear function of the RF or IF noise characteristics of a typical mobile channel. In practice the numerical weights should be determined experimentally by measuring and averaging the received bit error rates as a function of discriminator noise level over typical operating conditions of the mobile data system.

FIG. 1 illustrates a block diagram of a preferred embodiment of a soft quantizer. The soft quantizer has an input line 21 to accept binary data from a digital detector, such as from FSK detector 62 in FIG. 3, an input line 22 to accept an analog signal functionally related to the energy of the noise in the receiver's FM discriminator output, such as from discriminator 60 in FIG. 3, and an input line 23 to accept a recovered data clock signal from the bit synchronizer in the digital receiver. An analog to digital converter 24 converts the analog signal level on input line 22 to a digital representation for use as an address to access a read only memory (ROM) 25. One of the address lines 21 of the memory means is selected by the binary data input. In other words, the memory address is the concatenation of the analog to digital converter 24 output and the digital detector 62 output. The output of the read only memory 25 which is selected by the address from A to D converter 24 is latched by a latch 26. Latch 26 is clocked by the recovered data clock on line 23 to hold stable values of the soft quantized data output on output lines 27. Alternatively, the soft quantized data output could be obtained at the output port of a microprocessor, with the microprocessor performing the functions of the ROM 25 and latch 26, as will be seen hereinafter in FIG. 3 and the related description thereof. It should be noted that the design of analog to digital converters, addressable memories, microprocessors and latches are well known to persons skilled in the digital arts, and these components are available as off the shelf items.

Figure 2:
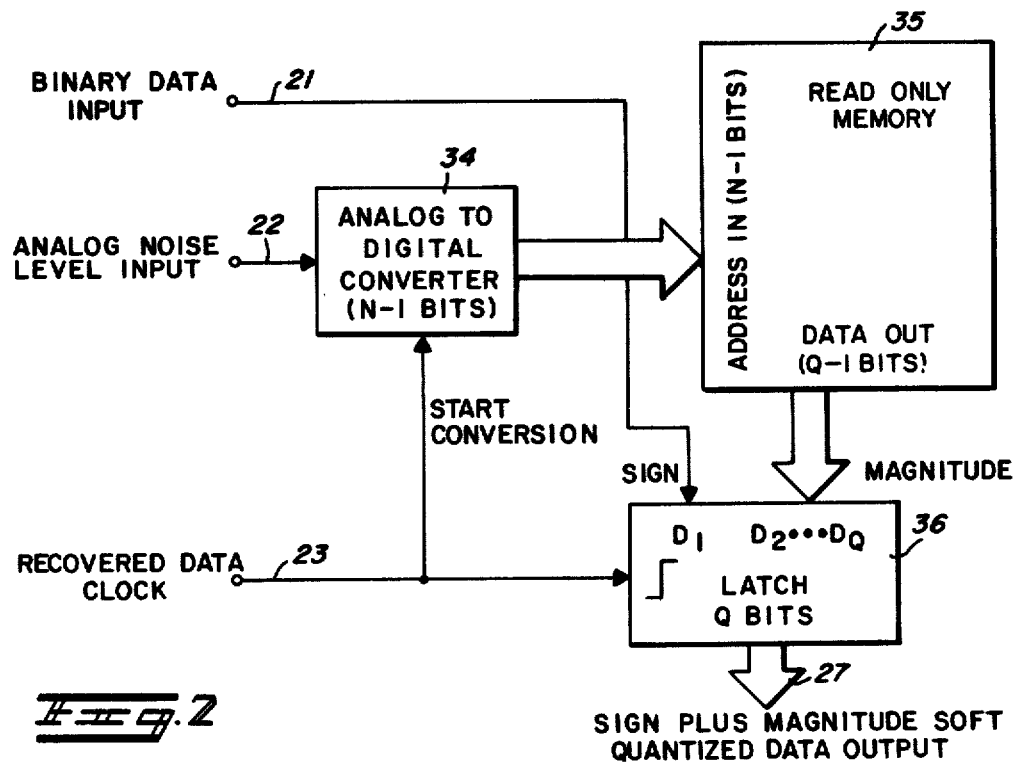
FIG. 2 is a block diagram of an alternative embodiment of a soft quantizer according to the invention.

If a large number of quantizing levels are desired, it may be advantageous to use a sign plus magnitude representation of the soft quantized data output. This in effect halves the memory requirements since only the magnitude need be stored in the PROM or ROM memory means in the case of a symmetric demodulator, that is, one in which the magnitude of the weights are not a function of the binary data input. The block diagram for this alternate system is shown in FIG. 2. Here the binary data input appears on line 21 and is fed directly to the latch 36. The analog noise energy input appearing on line 22 is fed to the analog to digital converter means 34 generating the address used for memory means in a read only memory 35. The memory need only store the magnitude of the soft quantized values which are then addressed and read out to be combined with the binary data input in the latch 36. The latch 36 is clocked by the recovered data clock line 23 to provide stable soft quantized data values on output lines 27.

It should be noted that the block diagrams of FIG. 1 and FIG. 2 can be implemented in circuitry in a number of ways. A preferred embodiment for use in an FM/FSK mobile data receiver is shown in FIG. 3. The antenna 52, RF stage 54, IF amplifier 56, IF limiter 58, discriminator 60, FSK detector 62, and bit synchronizer 64, are all circuits well known to persons skilled in the art of digital communications.

As previously discussed, the FSK detector 62 transforms the received data into hard quantized binary ones or zeros so that the output of detector 62 is not useful for good resolution of soft quantized data values. On the other hand, the outputs of RF stage 54 and IF amplifier 56 are not hard quantized and have useful signal to noise level information to obtain soft quantized values. However, several reasons dictate that the preferred point for obtaining useful signal to noise information is from the output of discriminator 60. Obtaining the RF or IF signal usually entails some receiver modification whereas the discriminator output is usually available in higher quality receivers. Any bit errors introduced by discriminator 60 would go undetected if sampling is done at the RF or IF level. Significant bit errors also occur at relatively low IF signal to noise ratios. The discriminator typically provides useful signal strength indications at a lower range of signal level, for example, from −90 dBm to −125 dBm, as compared to a typical useful signal strength indication range of −40 dBm to −90 dBm for IF signals. IF signal strength therefore varies in a different manner than the discriminator signal strength. Since most data signal errors occur at or near the noise floor, the discriminator output is more useful in determining soft quantized data values.

Since the time waveform of the discriminator output does not contain much useful information on how good the recovered data bits are, the frequency spectrum of the discriminator is analyzed. The data energy is found in the lower portion of the frequency spectrum. While noise will also be in the lower portion of the frequency spectrum, most of the noise will be found in the higher portion of the frequency spectrum. A high pass filter portion 66 of A/D converter 24 filters the discriminator output signal on line 22 to obtain an analog noise level therefrom. An R-C network, generally designated 63, at the noninverting input of an operational amplifier 67 is designed to pass frequencies above the frequency spectrum of the data signal. This typically means setting the cutoff frequency of the filter above the highest modulating frequency of the data signal. Filter 66 is a second order Butterworth filter.

A signal coupling capacitor 69 passes the analog noise signal from filter 66 to a full wave rectifier 68, but blocks any DC level from amplifier 67. A pair of small signal diodes 71 and 72 are oppositely poled in respective feedback paths from the output to the inverting input of an amplifier 70 to full wave rectify the analog noise signal. Another amplifier 74 sums the signals at a node 73 and provides the full wave rectified noise signal, which will now be a DC level, to a low pass filter 76. While other simpler implementations of full wave rectifier 68 will be apparent, this implementation was selected because of the availability of two amplifiers 70 and 74 in a standard four amplifier IC package after using amplifiers 67 and 77 for filters.

Amplifier 77 in conjunction with an R-C network, generally designated 75, forms a second order Butterworth low pass filter to filter out frequencies above about 600 Hz which may be either residual or caused by signal rectification in rectifier 68.

Reference voltages VT1 and VT2 in circuit portions 66, 68, 76 and 88 may be simply provided by filtered resistor dividers (not shown) from supply voltage $V_S$, with, for example, $VT1 = V_S/2$ and $VT2 = V_S/5$.

A combination of resistors 80 and 83 and a capacitor 81 on the input line 78 to the threshold comparator circuit 88 provide additional low pass filtering of the signal from low pass filter 76. Input line 78 is routed to the non-inverting input of each of a plurality of threshold voltage comparators 110, 115 and 120. The inverting input of comparators 110, 115 and 120 are each separately connected to respective ones of adjustable resistors 82, 84 and 86, which operate as potentiometers to supply an adjustable reference voltage to the comparators. Comparators 110, 115 and 120 are separately biased within the range of allowable comparator input values by adjustable resistors 82, 84 and 86. The range of the threshold levels must be small enough to accommodate the dynamic range of the FM discriminator noise energy level on data line 22. The comparators 88 in conjunction with the threshold level adjusting resistors 82, 84 and 86 provide a very simple and inexpensive analog to digital converter which has four possible outputs. Possible combinations are; all of the output lines 96, 98 and 100 are low, line 96 is high and the rest are low, lines 96 and 98 are high and line 100 is low, lines 96, 98 and 100 are all high. Rather than decoding these four possible combinations to a binary representation it is easier to feed all three output lines to the input port of microprocessor 102 and let the microprocessor do the decoding by a counting operation. Of course, if greater soft quantizing resolution is desired, additional comparators similar to comparators 110, 115 and 120 may be added to threshold comparator circuit 88, each having an input line, such as line 95, to microprocessor 25.

Output line 96 may also be used to activate an LED 94 through a current limiting resistor 92. The LED will then indicate the logic level of comparator output line 96 which may be used as a reference level to set the comparator threshold adjustment for the least significant bit. Typically this adjustment can be made by disconnecting antenna 52 and adjusting resistor 86 so that LED 94 just begins to blink on. In other words the comparator with the output signal on line 96 senses that the RF input signal at the antenna 52 is just beginning to overcome the noise of the receiver. Of course for a more accurate setting an accurate voltmeter could be connected to one of the input lines 78 of the comparators, or to output line 96.

Alternatively, microprocessor 102 could actually carry out the adjustment process if the gain adjust controlled the lower comparator threshold limit by a digital to analog converter connected to a microprocessor output port. It should also be noted that the voltage threshold levels established by resistors 82, 84 and 86 do not have to be linearly related. In fact here the threshold levels are preferred to be logrithmically related to give increments of about 5 dB or 10 dB. These threshold levels are selected to adequately cover the range of signal levels for which the numerical weights appreciably change. In general, any set of threshold levels could be used because the table of numerical weights in the microprocessor RAM or ROM memory can be programmed to reflect the chosen threshold settings. In fact it should be noted that the table in RAM or ROM of these numerical weights is actually a function of the communication channel and could be selected by the microprocessor for various channel conditions. The channel conditions could be periodically evaluated by keeping an update of the average received signal level and bit error rate estimated by the decoder.

In addition to decoding the comparator output lines 96, 98 and 100, the microprocessor accepts as an input the binary data bit detected by the FSK detector on line 21 as the most significant bit and also the recovered data clock signal on line 23 which may conveniently be used to interrupt the microprocessor each time a new data bit and analog signal strength level are received.

The microprocessor steps for implementing the soft quantizer are shown in FIG. 4. Basically this sequence of microprocessor steps reads the input bit and multiplies its value which is zero or one by 8 and counts the number of comparator lines that are high to generate a table offset which is then added to the starting address of the table to give the address in the table where the corresponding soft quantizer value is stored. This soft quantizer value can then be used in any number of decoding algorithms.

A table of soft quantizer values for a typical mobile radio fast fading channels is given in FIG. 5 corresponding to the table for the microprocessor steps in FIG. 4. These table values reflect the relative bit error rates as related to the noise energy in the discriminator output that are predicted from field tests. It should be noted that these are experimentally determined values and can be determined with a test receiver, employing the soft quantizer of FIG. 3 which is set up to receive a test pattern for which the microprocessor decoder can calculate the received bit error rate. The soft quantizer values in the table of FIG. 5 require four binary bits for storage and range from zero to fifteen, fifteen being the character "F" in hexidecimal code, for representing digital values ranging from a very good zero corresponding to a zero table value to a very good one corresponding to a table value of fifteen. In other words this is a sixteen level soft quantizer.

While an embodiment of the invention has been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

We claim:

1. A soft quantizer for converting a demodulated signal, including recovered digital data and an analog noise signal, from a discriminator output of a digital receiver employing non-linear demodulation, to soft quantized digital values reflecting the numerical weight of the decoded digital data, based upon the noise energy of the received demodulated signal, comprising:
   digital detector means to convert the recovered digital data from the discriminator to hard quantized digital data on a detector output line;
   analog to digital converter means for filtering the analog noise signal from the recovered digital data, converting the analog noise signal to a digital representation and supplying said digital representation as an output signal;
   addressable memory means having a plurality of addressable locations and from which previously stored predetermined numerical weights may be retrieved from one of the addressable locations as selected by the digital output signal from the analog to digital converter means; and
   combiner means for combining the hard quantized digital data from the output of the digital detector with the numerical weights read from said addressable memory means to generate a soft quantized digital value reflecting the numerical weight of the detected data, based upon the level of the noise energy in the digital receiver.

2. The soft quantizer of claim 1 wherein the digital detector generates a one bit binary digital output, and wherein said combiner means comprises output lines from the addressable memory means for the soft quantized magnitude, and an output line from the digital detector output, for the soft quantized sign bit, whereby a sign plus magnitude binary representation of the soft quantized digital values is obtained.

3. The soft quantizer of claim 2 further comprising a latching means for latching the soft quantized output, said latching means clocked by the recovered data clock of the digital receiver.

4. The soft quantizer of claim 1 wherein said combiner means comprises additional address lines to the addressable memory means for receiving the output of the digital detector, whereby the soft quantized values are read directly as outputs of said addressable memory means.

5. The soft quantizer of claim 4 further comprising a latching means for latching the soft quantized output, said latching means clocked by the recovered data clock of the digital receiver.

6. A method of generating a soft quantized digital data value based upon the noise energy of the received demodulated signal at a discriminator output of a digital receiver, said method comprising the steps of;
   converting the received demodulated signal from the discriminator output to hard quantized digital data;
   filtering the output of the discriminator to obtain an analog noise signal from the received demodulated signal;
   converting the analog noise signal to a digital representation;
   addressing a predetermined table of numerical weights by using said digital representation of the noise signal; and
   combining the addressed numerical weights with the hard quantized data values from the digital detector means to generate a soft quantized data output value based upon the analog noise signal and the recovered digital data in the demodulated signal.

7. The method of claim 6 for generating a soft quantized data value wherein the step of generating an address consists of concatenating the digital representation of the analog noise signal with the recovered digital data values.

8. The method of step 6 wherein the digital detector output is a one bit binary number, and the step of combining the addressed numerical weights with the digital detector output consists of appending the digital detector bit as a sign bit, whereby a sign plus magnitude soft quantized value is obtained.

* * * * *